(12) United States Patent
Szulczynski et al.

(10) Patent No.: US 11,466,610 B2
(45) Date of Patent: Oct. 11, 2022

(54) ROTOR FOR AN ELECTRIC DRIVE MACHINE FOR DRIVING A COMPRESSOR, A TURBINE OR A CHARGER SHAFT OF A TURBOCHARGER, AND TURBOCHARGER COMPRISING AN ELECTRIC DRIVE MACHINE AND SUCH A ROTOR

(71) Applicant: Robert Bosch GmbH, Stuttgart (DE)

(72) Inventors: Hubert Szulczynski, Marbach Am Neckar (DE); Rene Schepp, Waiblingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/298,869

(22) PCT Filed: Oct. 21, 2019

(86) PCT No.: PCT/EP2019/078522
§ 371 (c)(1),
(2) Date: Jun. 1, 2021

(87) PCT Pub. No.: WO2020/114662
PCT Pub. Date: Jun. 11, 2020

(65) Prior Publication Data
US 2022/0034255 A1 Feb. 3, 2022

(30) Foreign Application Priority Data
Dec. 6, 2018 (DE) .......................... 102018221 38.8

(51) Int. Cl.
*F02B 37/10* (2006.01)
*F01D 5/04* (2006.01)
(Continued)

(52) U.S. Cl.
CPC .............. *F02B 37/10* (2013.01); *F01D 5/043* (2013.01); *F01D 15/10* (2013.01); *F02C 6/12* (2013.01);
(Continued)

(58) Field of Classification Search
CPC .... F02B 37/10; F02B 2037/122; F01D 5/043; F01D 15/10; F02C 6/12; F05D 2220/40; F05D 2220/768
(Continued)

(56) References Cited

U.S. PATENT DOCUMENTS 6,305,169 B1 * 10/2001 Mallof ................... F02B 37/14
60/608
8,418,458 B2 * 4/2013 Williams .............. F01D 17/165
415/178
(Continued)

FOREIGN PATENT DOCUMENTS

CN 108054867 A 5/2018
DE 102007028356 A1 12/2008
(Continued)

OTHER PUBLICATIONS

International Search Report for PCT/EP2019/078522, dated Jan. 22, 2020.

*Primary Examiner* — Hoang M Nguyen
(74) *Attorney, Agent, or Firm* — Norton Rose Fulbright US LLP; Gerard Messina

(57) ABSTRACT

An exhaust-gas turbocharger having an electric drive unit for driving a compressor, a turbine, or a turbocharger shaft of the exhaust-gas turbocharger. The electric drive unit has a rotor and a stator. The rotor is equipped with a rotor body embodied around a rotation axis of the rotor. A receptacle for at least one permanent magnet is embodied on the rotor body. A permanent magnet is disposed in the receptacle of
(Continued)

the rotor body. The rotor body is mountable using a threaded bushing on a turbocharger shaft of the exhaust-gas turbocharger. The rotor body has a further receptacle which extends in the direction of the rotation axis and in which the threaded bushing is disposed inside the rotor body. The further receptacle is disposed in the rotor body with an offset in the direction of the rotation axis relative to the receptacle.

9 Claims, 5 Drawing Sheets

(51) Int. Cl.
*F01D 15/10* (2006.01)
*F02C 6/12* (2006.01)
*F02B 37/12* (2006.01)

(52) U.S. Cl.
CPC .... *F02B 2037/122* (2013.01); *F05D 2220/40* (2013.01); *F05D 2220/768* (2013.01)

(58) Field of Classification Search
USPC .................................. 417/406–407; 60/605.1
See application file for complete search history.

(56) References Cited

U.S. PATENT DOCUMENTS

| | | | |
|---|---|---|---|
| 2003/0223892 A1* | 12/2003 | Woollenweber | F02B 37/025 417/407 |
| 2004/0051416 A1 | 3/2004 | Yamada et al. | |
| 2004/0200215 A1* | 10/2004 | Woollenweber | F16C 19/548 60/407 |
| 2005/0123417 A1 | 6/2005 | DelVecchio et al. | |
| 2013/0318797 A1* | 12/2013 | Royal | F04D 25/06 29/898.041 |
| 2018/0062467 A1 | 3/2018 | Barthes et al. | |

FOREIGN PATENT DOCUMENTS

| | | |
|---|---|---|
| DE | 102017207532 A1 | 11/2018 |
| EP | 2511532 A1 | 10/2012 |
| GB | 2551450 A | 12/2017 |
| WO | 8911752 A1 | 11/1989 |
| WO | 2008141710 A1 | 11/2008 |

\* cited by examiner

ROTOR FOR AN ELECTRIC DRIVE MACHINE FOR DRIVING A COMPRESSOR, A TURBINE OR A CHARGER SHAFT OF A TURBOCHARGER, AND TURBOCHARGER COMPRISING AN ELECTRIC DRIVE MACHINE AND SUCH A ROTOR

BACKGROUND INFORMATION

A variety of electric drive units for an exhaust-gas turbocharger are available in the related art. German Patent Application No. DE 10 2017 207 532 A1, for example, describes an exhaust-gas turbocharger having an electric drive unit. Exhaust-gas turbochargers of this kind are used in particular in automotive engineering to increase the air charge in cylinders of an internal combustion engine, in order to enhance the performance of the internal combustion engine. An exhaust-gas turbocharger is equipped with an electric drive unit in order to drive the turbocharger shaft of the exhaust-gas turbocharger on which a compressor wheel as well as a turbine wheel are disposed. By way of the electric drive unit, aspirated fresh air can be compressed, and delivered to the internal combustion engine with elevated boost pressure, independently of an exhaust-gas flow of the internal combustion engine. Boost pressure buildup, which is otherwise delayed in time, can thereby be considerably speeded up.

An electric drive unit of this kind usually has a stator having a multi-phase drive winding to generate a driving magnetic field, and a rotor. The rotor has at least one permanent magnet, and is disposed nonrotatably on the shaft of the exhaust-gas turbocharger. Implementing electric-motor assistance by way of an electric drive unit integrated into the compressor or the turbine has the advantage that the motorized assistance system can be disposed in particularly space-saving fashion in the exhaust-gas turbocharger. Energization of the phases of the drive winding by way of a power electronics system provided therefor causes generation of the rotating driving magnetic field by which the rotor, mounted rotatably by way of the turbocharger shaft, is driven with a predefinable torque. The permanent magnet interacts in this context with the rotating magnetic field. In the electric drive unit described in German Patent Application No. DE 10 2017 207 532 A1, the rotor has a rotor body embodied concentrically around a rotation axis of the rotor; a receptacle for at least one permanent magnet being embodied on the rotor body; at least one permanent magnet being disposed in the receptacle of the rotor body. The electric drive unit described in German Patent Application No. DE 10 2017 207 532 A1 uses an advantageous configuration in which the only flow path of the medium is constituted through the stator of the media-gap machine.

PCT Patent Application No. WO 2008/141710 A1 describes an electric drive unit for driving a compressor of an exhaust-gas turbocharger, in which the rotor body of a rotor of the electric drive unit is mountable by way of a threaded bushing on a turbocharger shaft of the exhaust-gas turbocharger.

SUMMARY

A rotor in accordance with an example embodiment of the present invention, for an electric drive unit for driving a compressor, a turbine, or a turbocharger shaft of an exhaust-gas turbocharger, has a rotor body embodied around a rotation axis of the rotor; a receptacle for at least one permanent magnet being embodied on the rotor body; and at least one permanent magnet being disposed in the receptacle of the rotor body. The rotor body is advantageously mountable by way of a threaded bushing on a turbocharger shaft of the exhaust-gas turbocharger.

In accordance with an example embodiment of the present invention, the rotor body has a further receptacle which extends in the direction of the rotation axis and in which the threaded bushing is disposed inside the rotor body; the further receptacle being disposed in the rotor body with an offset in the direction of the rotation axis relative to the receptacle of the at least one permanent magnet.

The present invention further relates to an exhaust-gas turbocharger. In accordance with an example embodiment of the present invention, the turbocharger has an electric drive unit for driving a compressor, a turbine, or a turbocharger shaft of the exhaust-gas turbocharger; the turbocharger shaft being mounted rotatably around a rotation axis, and the electric drive unit having a rotor and a stator; the stator having a drive winding for generation of a driving magnetic field driving the rotor; the rotor having a rotor body embodied around the rotation axis; a receptacle for at least one permanent magnet being embodied on the rotor body; at least one permanent magnet being disposed in the receptacle of the rotor body; the rotor body being thread-mounted by way of a threaded bushing onto an external thread of the turbocharger shaft in such a way that a clamping force acting in the direction of the rotation axis presses the rotor body indirectly or directly against a stop on the turbocharger shaft; the rotor body having a further receptacle which extends in the direction of the rotation axis and in which the threaded bushing is disposed inside the rotor body; the further receptacle being disposed in the rotor body with an offset in the direction of the rotation axis relative to the receptacle of the at least one permanent magnet.

An important technical correlation in the context of development of an electric drive unit of an electrically assisted exhaust-gas turbocharger is to be seen in the ratio between the torque of the electric drive unit and the moment of inertia of the rotating group of the turbocharger. The mass of the rotor of the electric drive unit which is installed on the turbocharger shaft results in an additional load on the turbocharger shaft and on the associated bearing bushings, as compared with an exhaust-gas turbocharger having no electric drive unit. The high rotation speed of the exhaust-gas turbocharger presents particular difficulties. It is important for the entire assemblage to be mechanically and electrically stable even at high rotation speeds. The mass of the entire rotating assemblage installed on the turbocharger shaft is increased by the additional mass of the rotor. This means not only an increase in the moment of inertia of the turbocharger, but also a shift in the center of mass almost to the center of one of the bearing bushings of the turbocharger shaft. This effect can have negative consequences in terms of the resulting bearing load, since the surface pressure in the two running surfaces of the bearing bushings can vary considerably.

In addition to the problems associated with torques and moments of inertia, heat flow from the turbine into the bearing bracket represents a further challenge. In gasoline engines in particular, in the worst case this heat flow can cause the permanent magnets of the rotor to become demagnetized.

The rotor in accordance with an example embodiment of the present invention makes possible the production of an electric drive unit that represents a solution to the technical problems presented above. The rotor according to the present invention advantageously makes it possible to produce an electric drive unit having as little imbalance as possible in the rotating assemblage made up of the turbocharger shaft, compressor wheel or turbine wheel, and rotor. The permanent magnet of the rotor can furthermore be protected from damaging environmental influences, in particular exhaust gases and condensates, and corrosion can thus be avoided or at least reduced.

Demagnetization of the permanent magnets due to excessive heat input is furthermore prevented.

An advantageous result, as compared with the approaches in the related art, because the rotor body has a further receptacle which extends in the direction of the rotation axis and in which the threaded bushing is disposed inside the rotor body, the further receptacle being disposed in the rotor body with an offset in the direction of the rotation axis relative to the receptacle of the at least one permanent magnet, is that even when a threaded bushing is used to install the rotor, the turbocharger shaft does not, as in the existing art, need to be guided through the rotor magnet. The diameter of the rotor magnet can advantageously be selected to be very small, which has a positive effect in terms of the moment of inertia of the rotor. Advantageously, the rotor embodied according to the present invention can be thread-mounted onto a turbocharger shaft without greatly shifting the center of gravity of the rotating subassembly. There is therefore almost no negative influence on rotor running stability compared with an exhaust-gas turbocharger having no additional electrical drive unit. A further result achieved with this feature is that further degrees of freedom exist in terms of the disposition of the at least one permanent magnet in the receptacle of the rotor body, so that the permanent magnet, not having the turbocharger shaft passing through it, can be better protected from corrosion, and the entire assemblage can be embodied more robustly.

The terms "receptacle" and "further receptacle" refer to any recesses that are configured to hold at least one object of any kind, in particular in a desired position, and/or to separate the object from an environment of the object. The receptacle can therefore have a cavity. The cavity can have a shape that is complementary to the object. The object can have dimensions that preferably are smaller than the dimensions of the receptacle. The object can be disposed in the receptacle in such a way that the object can move in the receptacle. The receptacle can, however, also be embodied in such a way that movement of the object within the receptacle is avoided or at least reduced. Walls of the receptacle can be in contact with surfaces of the object. The receptacle can extend along an axis. In particular, a longitudinal axis of the receptacle can extend parallel to a longitudinal axis of the rotor.

Advantageous embodiments and refinements of the present invention are made possible by the features disclosed herein.

Advantageously, in accordance with an example embodiment of the present invention, the threaded bushing has an internal thread and an outer envelope, the outer envelope of the threaded bushing coming into abutment against an inner wall of the further receptacle upon a rotation around the rotation axis relative to the rotor body. The advantageous result thereof is that the rotor body can be thread-mounted onto the turbocharger shaft by way of a tool applied onto the rotor body, by the fact that upon tightening, the threaded bushing braces against the inner wall of the further receptacle constituting a buttress, so that the corresponding axial clamping force can be applied during tightening. The threaded bushing can have fine or standard threads, by way of which a defined axial force can be applied.

In accordance with an example embodiment of the present invention, it is particularly advantageous if an inside diameter of the further receptacle is embodied to be larger than an outside diameter of the threaded bushing, so that perpendicularly to the rotation axis, a clearance exists in a radial direction between the threaded bushing and the rotor body. Because the rotor body of the rotor should be oriented as concentrically as possible with respect to the turbocharger shaft of the exhaust-gas turbocharger so as to generate as little imbalance as possible in the overall system, it is advantageous if the threaded connection used to mount the rotor allows a radial tolerance compensation. Because of the clearance between the threaded bushing and rotor body, the threaded bushing functions, so to speak, as a "floating" bushing, so that centering of the rotation axis of the rotor on the rotation axis of the turbocharger shaft can be performed in simplified fashion by way of an alignment means independent of the thread coupling, as will be explained below.

Corrosion of the at least one permanent magnet can advantageously be avoided by the fact that the rotor body has a sleeve surrounding the at least one permanent magnet. The sleeve represents, so to speak, a "bandage" or "reinforcement" for the at least one permanent magnet in order to protect it effectively even in a context of large centrifugal forces and harsh temperature influences on the exhaust-gas turbocharger. The sleeve should not influence the magnetic properties of the permanent magnet and of the stator. The material of the sleeve should therefore be nonmagnetic. The sleeve can furthermore advantageously have a thin wall thickness, since this likewise has an influence on magnetic flux.

The sleeve can be disposed on an attachment element of the rotor body, the further receptacle for the threaded bushing being disposed in the attachment element. Advantageously, the attachment element can have an outer envelope, an inner side facing toward the at least one permanent magnet, and an outer side facing away therefrom; the further receptacle can be embodied as a depression embodied on the inner side of the attachment element. An attachment element of this kind can be fabricated inexpensively as a simple lathe-turned part from, for example, stainless steel (in particular X5CrNiCuNb16-4 stainless steel). The threaded bushing can be received in the further receptacle of the attachment element with a radial and axial clearance, and can be put in place from the inner side out.

It is particularly advantageous if the sleeve is produced, and mounted on the completed attachment element, independently of the attachment element. The entire assemblage of the rotor body can be produced in simple and economical fashion. The at least one permanent magnet (for example, a magnet made of SmCo, Sm2Co17, or NdFeB), can advantageous be press-fitted into the sleeve. The sleeve can be, for example, a tube blank made of a nonmagnetic material (for example Inconel® 718, nickel alloys, titanium, or fine-grain carbide).

The purpose of the at least one permanent magnet is to drive the exhaust-gas turbocharger by way of a magnetic field that is induced via the stator. The press fit between the permanent magnet and sleeve must therefore be dimensioned sufficiently to allow the necessary torque to be transferred. It is advantageous for this purpose if a backing washer, covering the threaded bushing on the inner side of the attachment element, is provided between the inner side of the attachment element and the at least one permanent magnet. The rotor body can furthermore have a further backing washer on a side of the permanent magnet which faces away from the threaded bushing. The backing washers can be made of the same material as the sleeve. Without the backing washers and the attachment element, higher joint pressures and tangential stresses could occur at the outlet of the sleeve in the context of a press fit of the permanent magnet in the sleeve. The backing washers advantageously protect the permanent magnet from large mechanical loads during pressing into the sleeve, in particular at its edges. Upon production of the rotor, the sleeve can be pressed on via the magnet unit made up of the backing washers and permanent magnet. The sleeve, having the installed magnet assembly, can then be radially welded to the attachment element. The permanent magnet is protected axially by the backing washers. The further backing washer on the end face of the rotor body can be axially welded to the sleeve after installation on the attachment element.

Advantageously, the rotor body can have, concentrically with the rotation axis, a cylindrical bore that serves for introduction of the turbocharger shaft. Because the inside diameter of the cylindrical bore is embodied to be smaller than an inside diameter of the further receptacle, a step is formed which constitutes a support for the threaded bushing. The bore can advantageously be embodied with a centering diameter so that, for example, centering of the rotor body on the turbocharger can be achieved, independently of the threaded connection by way of the threaded bushing, by way of a clearance fit or by pressing the inner wall of the bore onto the outside diameter of the turbocharger shaft.

Also advantageous in accordance with an example embodiment of the present invention is an exhaust-gas turbocharger having an electric drive unit for driving a compressor, a turbine, or a turbocharger shaft of the exhaust-gas turbocharger; the turbocharger shaft being mounted rotatably around a rotation axis, and the electric drive unit having a rotor and a stator; the stator having a drive winding for generation of a driving magnetic field driving the rotor; the rotor having a rotor body embodied around the rotation axis; a receptacle for at least one permanent magnet being embodied on the rotor body; at least one permanent magnet being disposed in the receptacle of the rotor body; the rotor body being thread-mounted by way of a threaded bushing onto an external thread of the turbocharger shaft in such a way that a clamping force acting in the direction of the rotation axis presses the rotor body indirectly or directly against a stop on the turbocharger shaft. According to the present invention, the rotor body has a further receptacle which extends in the direction of the rotation axis and in which the threaded bushing is disposed inside the rotor body; the further receptacle being disposed in the rotor body with an offset in the direction of the rotation axis relative to the receptacle of the at least one permanent magnet. Application of the axial clamping force by way of the threaded connection on the turbocharger shaft can advantageously be effected independently of the centering of the rotor body relative to the turbocharger shaft.

It is particularly advantageous in this connection if the rotor body has, concentrically with the rotation axis, a cylindrical bore; the inside diameter of the cylindrical bore being embodied to create a clearance fit or an interference fit between the turbocharger shaft and the inner wall of the bore. This advantageously makes it possible to thread-mount the rotor onto the turbocharger shaft by way of a threaded connection, and at the same time to align it by way of a cylindrical press connection or clearance fit relative to the shaft axis or rotation axis of the turbocharger shaft. The rotor is thus optimally aligned with respect to the shaft axis, which has a positive effect on the imbalance of the system. The rotor can be tightened in rotation-angle-controlled fashion during installation in order to ensure the necessary axial force. A clearance fit rather than the press fit in this region is also possible. With a clearance fit, balancing of the overall configuration is recommended in order to avoid imbalance in the system.

In order to allow the rotor to be thread-mounted without difficulty, a radial tolerance compensation can be provided which can be implemented by way of a threaded bushing disposed with a radial clearance in the further receptacle. The rotor can be thread-mounted in simple fashion onto the turbocharger shaft by way of a double flat or a hexagon and/or by way of a collet, or in similar fashion.

Advantageously, the axial clamping force acting in the direction of the rotation axis can press the rotor body against a compressor wheel of the compressor, and press the compressor wheel against a stop on the turbocharger shaft. An axial preload onto the compressor wheel can thus be effected by way of the rotor. The axial force advantageously serves for correctly positioned immobilization of the compressor wheel at high rotation speeds.

DETAILED DESCRIPTION OF EXAMPLE EMBODIMENTS

Figure 1:
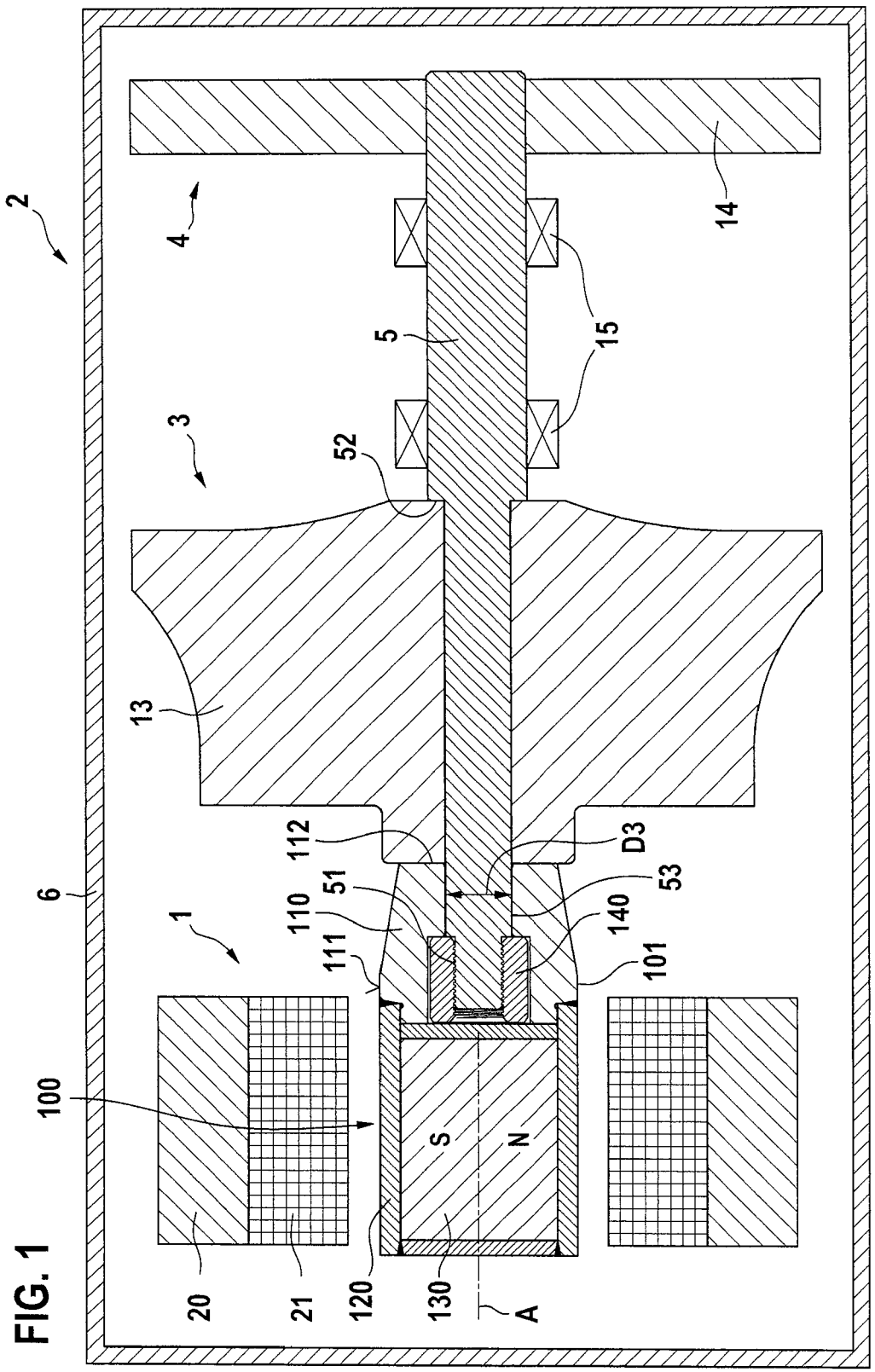
FIG. 1 is a schematic section view of an exhaust-gas turbocharger having an electric drive unit in accordance with an example embodiment of the present invention.

FIG. 1 is a longitudinal section through an exhaust-gas turbocharger 2 of an internal combustion engine, having an electric drive unit 1. The exhaust-gas turbocharger encompasses a housing 6, depicted here merely schematically, which in particular can also be embodied in multiple parts with a bearing housing, a compressor housing (not depicted) and a turbine housing. The exhaust-gas turbocharger encompasses a compressor 3 and a turbine 4. A compressor wheel 13 of compressor 3, and a turbine wheel 14 of turbine 4, are schematically shown in FIG. 1. Compressor wheel 13 and turbine wheel 14 can be disposed nonrotatably on a shared turbocharger shaft 5. Turbocharger shaft 5 is mounted rotatably around a rotation axis A in bearing bushings 15 in housing 6 of exhaust-gas turbocharger 2.

Turbine 4 can be understood as a rotating flow machine that is configured to convert a drop in the internal energy of a flowing fluid into a mechanical power output that it delivers via turbocharger shaft 5. A portion of an internal energy, in particular encompassing energy of motion, energy of position, and/or energy of pressure, can be extracted from a fluid flow by way of a maximally turbulence-free laminar flow around turbine blades, and can transfer to guide vanes of the turbine. Turbocharger shaft 5 can then be caused to rotate by a portion of the internal energy, and a usable power output can be delivered to a connected working machine, such as a compressor 3. Turbine 4 can be configured to be driven by exhaust gases of a combustion engine.

Compressor 3 is configured to increase a pressure and/or a density of a flowing gas, and in particular of flowing air. The compressor can be in particular a radial compressor. The radial compressor can be used to add energy to a flowing fluid by way of a rotating rotor, in accordance with the laws of fluid mechanics. The radial compressor can be embodied in such a way that the gas flows substantially axially into a compressor wheel 13 and is then deflected radially, i.e., outward.

Electric drive unit 1 is configured to generate a rotational motion of a rotor by application of an electric current. The electric drive unit is configured entirely or partly as an electric motor. The electric drive unit is used in particular to drive the compressor, the turbine, or turbocharger shaft 5 of exhaust-gas turbocharger 2. Electric drive unit 1 can be installed, in particular like the electric drive machine described in German Patent Application No. DE 10 2017 207 532 A1, in an exhaust-gas turbocharger, the electric drive unit presented here having a configuration of the rotor which is novel as compared with German Patent Application No. DE 10 2017 207 532 A1 and which enables an advantageous connection to the turbocharger shaft.

The electric drive unit has a rotor 100 and a stator 20. Stator 20 constitutes a stationary component of electric drive unit 1 and has, for example, an annular stator yoke as well as stator teeth which project radially inward from the stator yoke and are disposed in uniformly distributed fashion with a spacing from one another when viewed in a circumferential direction. The stator teeth are usually wound with a multi-phase drive winding 21; energization of the phases of drive winding 21 by way of a power electronics system provided therefor causes generation of the rotating driving magnetic field by which rotor 100, rotatably mounted by turbocharger shaft 5, is driven with a predefinable torque. Rotor 100 has a rotor body 101 that is configured to receive at least one permanent magnet 130. Rotor body 101 can, however, also receive more than one permanent magnet 130. Rotor 100 interacts with the rotating magnetic field of stator 20. Rotor body 101 of rotor 100 is embodied as a solid of revolution around a rotation axis A, in particular is embodied concentrically around rotation axis A. Rotation axis A of rotor body 101 is preferably identical to the rotation axis of turbocharger shaft 5. A receptacle 190 for the at least one permanent magnet 130 is embodied on rotor body 101. Rotor body 101 is thread-mounted by way of a threaded bushing 140 onto an external thread 51 of turbocharger shaft 5, in such a way that an axial clamping force resulting from the thread mounting and acting in the direction of rotation axis A presses rotor body 101 directly, or indirectly with interposition of compressor wheel 13 and optionally of further components, for example an axial bearing of turbocharger shaft 5, against a stop 52 on turbocharger shaft 5. Turbocharger shaft 5 can be embodied in one piece, as depicted. Turbocharger shaft 5 can also, however, be embodied in multiple parts and can have a rotor shaft that is attached to the rotor and is nonrotatably couplable to the turbocharger shaft, for example via a coupling apparatus. Turbocharger shaft 5 has a cylindrical outer envelope that is equipped, at its end facing toward rotor 100, with external thread 51.

The configuration of rotor 100 will firstly be described in more detail with reference to FIG. 2. Rotor 100 is preferably constructed in several pieces, and has at least rotor body 101, threaded bushing 140, and the at least one permanent magnet 130. The permanent magnet has, as depicted, at least one north and one south pole, and can be, for example, a magnet made of SmCo, Sm2Co17, or NdFeB. Rotor body 101 is particularly preferably also constructed in several pieces. Rotor body 101 has in particular a sleeve 120 surrounding permanent magnet 130, sleeve 120 being disposed on an attachment element 110 of rotor body 101. The term "sleeve" refers in principle to any elongated hollow body. The hollow body can have a length and a diameter. The length can be greater than the diameter, for example by a factor of 1.5, preferably by a factor of 2, particularly preferably by a factor of 3. The diameter can have, in particular, a round shape. Other configurations are, however, possible. The sleeve can therefore also be referred to as a "tube." The internal cylindrical wall of sleeve 120 constitutes a receptacle 190 for permanent magnet 130. Permanent magnet 130 is, in particular, press-fitted into sleeve 120, as will be explained in further detail below. The sleeve can be produced in particular from a nonmagnetic material. Influence by the sleeve on magnetic properties of the permanent magnet and/or of the stator can thereby be avoided or at least more greatly reduced. The sleeve can furthermore be configured to protect the permanent magnet, in particular radially, from corrosion. In a context of higher rotation speeds, the permanent magnet can be more intensely pressed and/or "bandaged" so that it is not damaged by centrifugal force. Greater pressure can result in an increase in stress in the sleeve, which can be reduced in turn by increasing the wall thickness. For example, the sleeve can have a wall thickness of 0.1 to 5 mm, in particular of 0.5 mm to 2 mm, preferably of 0.8 mm to 1.5 mm, and particularly preferably of 1.025 mm.

Attachment element 110 can have a cylindrical outer envelope, an inner side 113 that faces toward the at least one permanent magnet 130, and an outer side 112 that faces away therefrom. Attachment element 110 can be produced from stainless steel, for example as a simple lathe-turned part. Configured on inner side 113 of attachment element 110, concentrically with rotation axis A, is a depression 182 that constitutes a further receptacle 180 for threaded bushing 140. A backing washer 160, which covers threaded bushing 140 on inner side 113 of attachment element 110, is disposed between inner side 113 of attachment element 110 and the at least one permanent magnet 130. On that side of permanent magnet 130 which faces away from threaded bushing 140, rotor body 101 has a further backing washer 170 that will also be referred to hereinafter as an "outer" backing washer. Attachment element 110 furthermore has a cylindrical bore 150 concentric with rotation axis A. Inside diameter D1 of cylindrical bore 150 is embodied to be smaller than inside diameter D2 of further receptacle 180, thereby forming a step 114 that forms a support 115 for threaded bushing 140.

Threaded bushing 140 can preferably be inserted into further receptacle 180 from inner side 113. As is further evident from FIG. 2, threaded bushing 140 has an internal thread 142 and an outer envelope 141. Outer envelope 141 of the threaded bushing and inner wall 181 of further receptacle 180 are embodied in such a way that upon a rotation around rotation axis A relative to rotor body 101, outer envelope 141 comes into abutment against an inner wall 181 of further receptacle 180. Outer envelope 141 can have for that purpose a projection (not depicted) that, upon a rotation around rotation axis A relative to rotor body 101, comes into abutment against a step (also not depicted) of inner wall 181. For example, outer envelope 141 of threaded bushing 140 can be constituted by a hexagon. Correspondingly thereto, inner wall 181 of attachment element 110 can likewise be constituted as a complementary hexagon. In addition, inside diameter D2 of further receptacle 180 is embodied to be somewhat larger than the outside diameter of threaded bushing 140. This ensures that a clearance S1 exists in a radial direction, perpendicularly to rotation axis A, between threaded bushing 140 and rotor body 101, as is apparent from FIG. 2. Threaded bushing 140 is thus inserted with a clearance into further receptacle 180, but can nevertheless come into abutment against inner wall 181 of further receptacle 180 upon a rotation around axis A. Alternatively, it is also possible to equip outer envelope 141 of the threaded bushing with a harmonic triangular profile or P3G profile. The harmonic polygonal profile having a continuous P3-shaped curve results in an "equal thickness" in all angular positions, and thus yields a high-quality profile for torque transfer.

Before the mounting of rotor 100 on turbocharger shaft 5 is discussed, a method for producing rotor 100, and the further construction of rotor 100, will be explained with reference to FIGS. 6a to 6c and 7a to 7e.

Figure 6C:
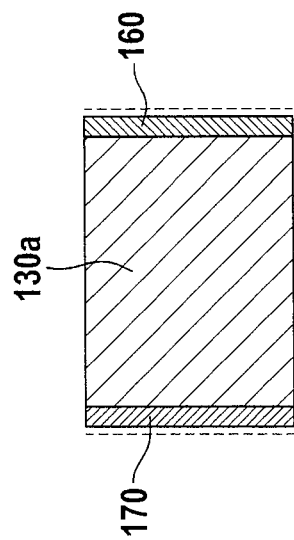
FIGS. 6a to 6c are cross sections through a magnet subassembly during production, in accordance with an example embodiment of the present invention.
Figure 6B:
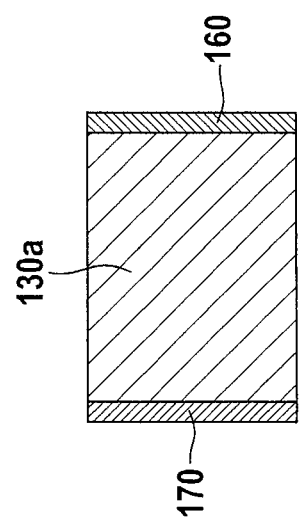
Figure 6A:
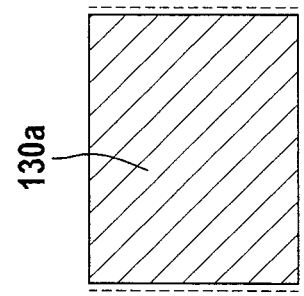

In a first step for producing rotor 100, for example, in FIG. 6a a not-yet-magnetized blank 130a for the subsequent permanent magnet 130, having cylindrical dimensions, is furnished. The end faces of blank 130a are ground off at the axial end faces depicted in FIG. 6a by the dashed line. A backing washer 160 and a further backing washer 170 are then adhesively bonded onto the end faces of blank 130a which face away from one another, as depicted in FIG. 6b. Backing washers 160, 170 can be produced as stamped parts from nonmagnetic material, and can then have been subjected to a heat treatment and a grinding process.

Figure 7A:
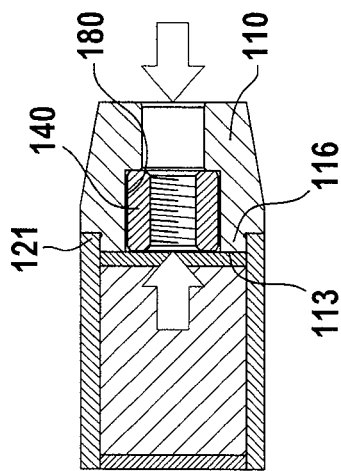
FIGS. 7a to 7e are further cross sections through the magnet subassembly and the rotor body during production of the rotor, in accordance with an example embodiment of the present invention.

As depicted in FIG. 6c, the subassembly made up of blank 130 and the bonded-on backing washers 160, 170 can be subjected at the surface to a further grinding operation. This subassembly is then introduced into sleeve 120, as depicted in FIG. 7a. This can be effected, for example, by press-fitting. In supplementary or alternative fashion, a heat treatment of sleeve 120 can also be performed. It is also possible to heat up the sleeve, introduce the subassembly into the sleeve, and then cool the entire combined unit. The compressive force between the sleeve and permanent magnet must be sufficient to allow the necessary torques to be transferred. Backing washers 160, 170 protect, in particular, the edges of blank 130a from damage when sleeve 120 is pressed on. Sleeve 120 preferably has an encircling collar 121 that constitutes an axial prolongation in the direction of rotation axis A and protrudes from the subassembly beyond backing washer 160. As is evident from FIG. 7a, blank 130a fills up the entire space between the inner side of sleeve 120 and backing washers 160, 170.

Figure 7C:
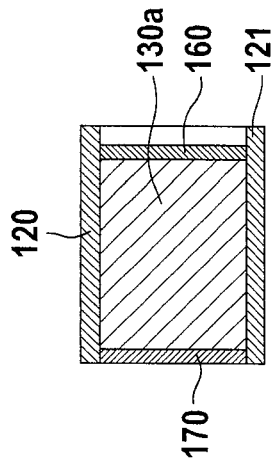
Figure 7B:
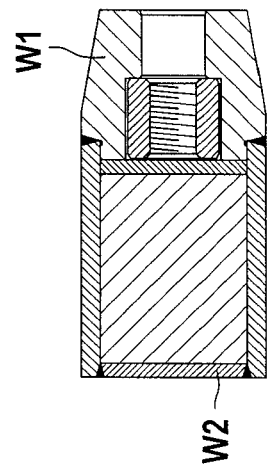

As shown in FIG. 7b, the assembled magnet subassembly from FIG. 7a can be disposed on the above-described attachment element 110. Firstly, threaded bushing 140 is inserted into further receptacle 180 of attachment element 110, and then the magnet subassembly is slid or pressed, with collar 121, over a shoulder 116 on inner side 113 of the attachment element.

Then, as shown in FIG. 7c, the encircling collar 121 can be welded encirclingly in a radial direction to attachment element 110 at position 202. In addition, a further welding operation takes place at position 201, in an axial direction or also (not depicted) a radial direction, between the encircling rim of further backing washer 170 and sleeve 120.

Figure 7D:
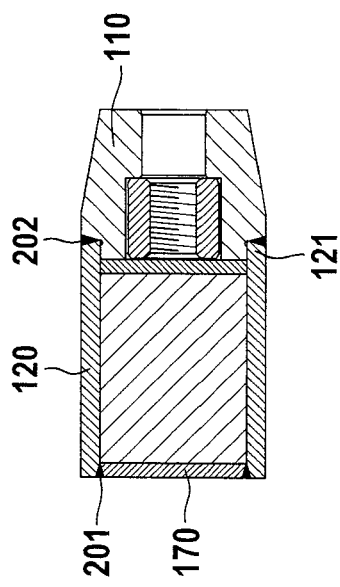

In a further step that is indicated in FIG. 7d, the almost completely manufactured rotor 100 is balanced in planes at positions W1 and W2 in FIG. 7d.

Figure 7E:
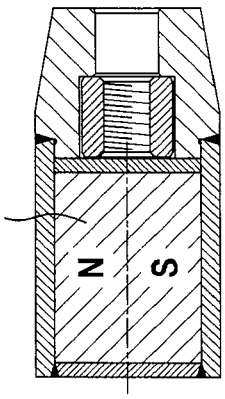

Lastly, as shown in FIG. 7e, blank 130a can be magnetized and thereby converted into permanent magnet 130.

Figure 2:
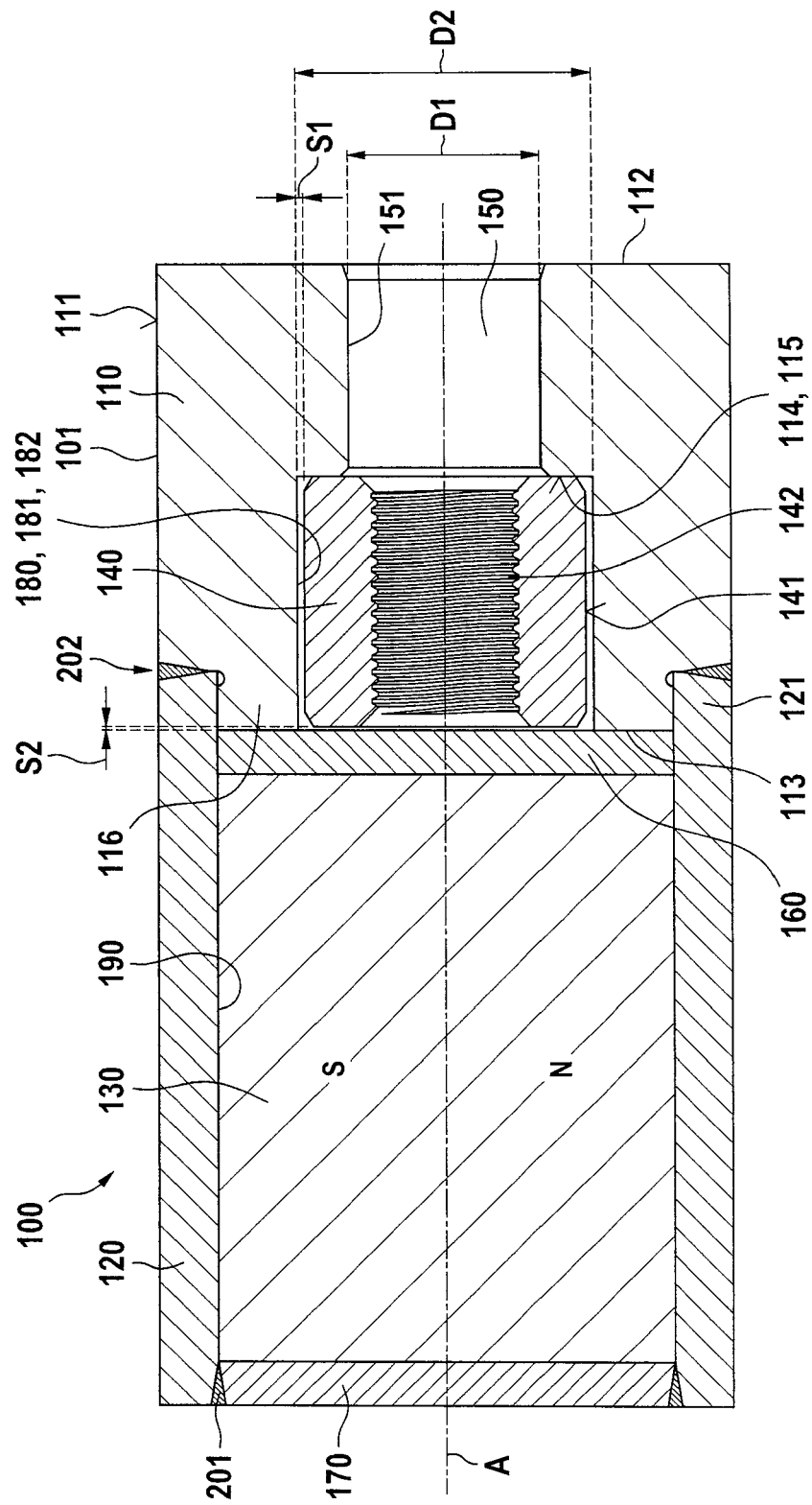
FIG. 2 shows a rotor of the electric drive unit in a second example embodiment of the present invention slightly modified as compared with FIG. 1.

As can be gathered best from FIG. 2, in the completely manufactured rotor 100 a further clearance S2 exists between inner backing washer 160 and threaded sleeve 140. Threaded sleeve 140 is movable thereby in an axial direction (i.e., in the direction of rotation axis A), and as a result of clearance S1 in a radial direction (perpendicularly to the rotation axis), and is movable in further receptacle 180, so to speak, as a "floating" bushing. As is further evident from FIG. 2, the cylindrical outer wall of sleeve 120 can be embodied in particular to be aligned with outer wall 111 of attachment element 110, so that overall a cylindrical conformation of rotor body 101 exists; this is not, however, obligatorily necessary.

Figure 3:
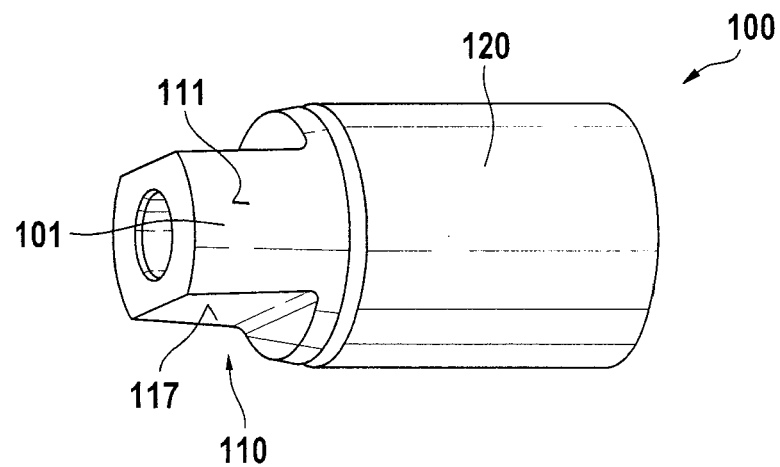
FIG. 3 is a perspective view of a rotor in accordance with a third example embodiment of the present invention.

FIG. 3 is a perspective view of a rotor body 101 in accordance with a further exemplifying embodiment. In order to facilitate the installation of rotor 100 on turbocharger shaft 5, rotor body 101 can have a shape that allows placement of an installation tool. As shown in FIG. 3, rotor body 101 has on outer envelope 111 of attachment element 110 a wrench flat 117 for placement of a wrench. In the exemplifying embodiment shown in FIG. 3, wrench flat 117 has two flats.

Figure 4:
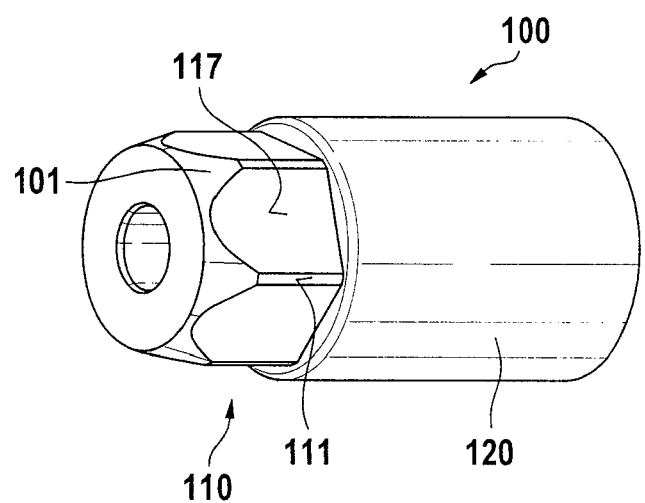
FIG. 4 is a perspective view of a rotor in accordance with a fourth example embodiment of the present invention.

FIG. 4 is a perspective view of a rotor body 101 in accordance with a further exemplifying embodiment. Only the differences with respect to the exemplifying embodiment of FIG. 3 will be described below, and identical components are labeled with identical reference characters. As shown in FIG. 4, wrench flat 117 can be embodied hexagonally. Alternatively, wrench flat 117 can be embodied in square or similar fashion.

Figure 5:
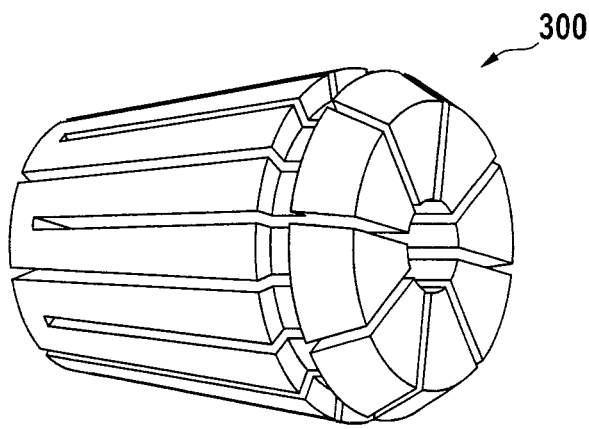
FIG. 5 is a perspective view of a clamping tool in accordance with an example embodiment of the present invention.

FIG. 5 is a perspective view of a collet 300. The collet represents a clamp for clamping workpieces or tools rapidly and nonpositively with high accuracy. It is made up of a externally wedge-shaped radially slotted sleeve having a round (occasionally also square or hexagonal) bore of defined size. A collet includes a collet chuck having an inner taper that matches the collet. Clamping is effected by tightening a coupling nut, with which the collet is pushed into the internal taper of the collet chuck. Because of the slots in the collet, the bore becomes uniformly compressed in its interior, with the result that the workpiece or tool becomes nonpositively retained. Collets clamp unfinished or machined parts quickly, immovably, and with accurate centering. Outer envelope 111 of attachment element 110 can have a mounting portion for mounting collet 300. Rotor 100 can be correspondingly mounted on turbocharger shaft 5 by way of collet 300, in particular by retaining and/or counter-tightening the turbocharger shaft in the region of the turbine wheel.

It is furthermore also possible to equip rotor 100 in the region of further backing washer 170 with a torx socket (not depicted) into which a tool for bolting rotor 100 onto turbocharger shaft 5 can be inserted.

In all embodiments, rotor 100 can be thread-mounted onto turbocharger shaft 5 by way of a threaded connection, and at the same time can be aligned, for example with a cylindrical press fit, with respect to rotation axis A of turbocharger shaft 5. As already stated, attachment element 110 of rotor 100 has a cylindrical bore 150 concentric with rotation axis A. Inside diameter D1 of this cylindrical bore 150 is embodied to constitute a clearance fit or an interference fit between turbocharger shaft 5 and inner wall 151 of the bore.

A "fit" is to be understood as a dimensional relationship between two components that are intended to fit together without reworking. These components have the same contour at the join, one as an internal shape and one as an external shape. The two contours have the same nominal dimension. What differs are the two tolerance zones within which the respective actual dimension, resulting in the context of fabrication, of the internal shape and external shape must lie.

A "press fit" is a dimensional relationship between two components, in the form of an internal shape and an external shape, in which the maximum dimension of an inner contour of the outer shape is in all cases smaller than a minimum dimension of an outer contour of the inner shape. The press fit can also be referred to as an "interference fit." The interference, or "overdimension," should in principle be embodied to be as small as possible based on an expected torque increase upon installation of the rotor on the turbocharger shaft. In principle, the torsional moment can increase as a higher pressure is selected.

Turbocharger shaft 5 has, at its end provided for the mounting of rotor 100, a first portion having an external thread 51 (FIG. 1). Adjoining the portion equipped with external thread 51 in a direction of rotation axis A, on the side of external thread 51 facing away from the rotor, is a region in which turbocharger shaft 5 has a cylindrical outer envelope 53 that is provided as a press-fitting region. In the exemplifying embodiment depicted in FIG. 1, cylindrical outer envelope 53 has a diameter D3 that is greater than inside diameter D1 of cylindrical bore 150.

When rotor 100 is secured on turbocharger shaft 5, the region equipped with external thread 51 is pushed through bore 150 of rotor body 101 and screwed into threaded bushing 140. At the same time, inner wall 151 of bore 150 is pressed onto cylindrical outer envelope 53.

As rotor 100 is screwed onto turbocharger shaft 5, threaded bushing 140 functions as a floating threaded bushing and permits a radial tolerance compensation as a result of clearance S1. Threaded bushing 140 has an internal thread 142 that can be a fine or standard internal thread. The fine thread can have an advantage over a standard thread in terms of greater self-locking. The standard thread can be a standardized thread having metric dimensions. It usually has a 62° bevel angle. Such threads are standardized, for example, in accordance with DIN 13-1. The standard thread can furthermore be a UNF thread. A "fine thread" is to be understood in the context of the present invention as a thread that has a narrower thread profile as compared with the standard thread. For differentiation it is usually identified, in addition to the outside diameter, with the dimension of its (likewise smaller) pitch.

Upon mounting of rotor 100, centering of the rotor relative to rotation axis A of turbocharger shaft 5 occurs by way of the press fit between inner wall 151 of bore 150 and outer envelope 53 of turbocharger shaft 5. An axial clamping force is generated by way of threaded bushing 140: threaded bushing 140 braces against support 115 of attachment element 110 and thereby generates a clamping force that presses attachment element 115 with its outer side 112 against a stop surface on compressor wheel 13, as is most clearly evident from FIG. 1. Compressor wheel 13 in turn braces against a stop 52 of turbocharger shaft 5, so that compressor wheel 13 becomes clamped between stop 52 and attachment element 110 of rotor 100. A defined axial preload force can thus be exerted on the compressor wheel by way of rotor 100.

If a clearance fit is used instead of the press fit between inner wall 151 and the outer envelope, subsequent balancing of the subassembly is advisable. With a clearance fit there exists between two components, in the form of an inner shape and an outer shape, a dimensional relationship in which the maximum dimension of an inner contour of the outer shape is somewhat larger than a maximum dimension of an outer contour of the inner shape.

What is claimed is:

1. A rotor for an electric drive unit for driving a compressor, or a turbine, or a turbocharger shaft of an exhaust-gas turbocharger, comprising:
   a rotor body embodied around a rotation axis of the rotor and being mountable using a threaded bushing on a turbocharger shaft of the exhaust-gas turbocharger;
   a receptacle for at least one permanent magnet embodied on the rotor body;
   at least one permanent magnet disposed in the receptacle of the rotor body;
   wherein the rotor body has a further receptacle which extends in a direction of the rotation axis and in which the threaded bushing is disposed inside the rotor body, the further receptacle being disposed in the rotor body with an offset in a direction of the rotation axis relative to the receptacle of the at least one permanent magnet,
   wherein an inside diameter of the further receptacle is larger than an outside diameter of the threaded bushing, so that perpendicularly to the rotation axis a clearance exists in a radial direction between the threaded bushing and the rotor body.

2. The rotor as recited in claim 1, wherein the threaded bushing has an internal thread and an outer envelope, wherein the outer envelope of the threaded bushing comes into abutment against an inner wall of the further receptacle upon a rotation around the rotation axis relative to the rotor body.

3. The rotor as recited in claim 1, wherein the rotor has a sleeve surrounding the at least one permanent magnet, the sleeve being disposed on an attachment element of the rotor body, and the further receptacle for the threaded bushing is disposed in the attachment element.

4. The rotor as recited in claim 3, wherein the attachment element has an outer envelope, an inner side that faces toward the at least one permanent magnet, and an outer side that faces away from the at least one permanent magnet, and wherein the further receptacle is a depression embodied on the inner side of the attachment element.

5. A rotor for an electric drive unit for driving a compressor, or a turbine, or a turbocharger shaft of an exhaust-gas turbocharger, comprising:
   a rotor body embodied around a rotation axis of the rotor and being mountable using a threaded bushing on a turbocharger shaft of the exhaust-gas turbocharger;
   a receptacle for at least one permanent magnet embodied on the rotor body;
   at least one permanent magnet disposed in the receptacle of the rotor body;
   wherein the rotor body has a further receptacle which extends in a direction of the rotation axis and in which the threaded bushing is disposed inside the rotor body, the further receptacle being disposed in the rotor body with an offset in a direction of the rotation axis relative to the receptacle of the at least one permanent magnet,
   wherein the rotor has a sleeve surrounding the at least one permanent magnet, the sleeve being disposed on an attachment element of the rotor body, and the further receptacle for the threaded bushing is disposed in the attachment element,
wherein the attachment element has an outer envelope, an inner side that faces toward the at least one permanent magnet, and an outer side that faces away from the at least one permanent magnet, and wherein the further receptacle is a depression embodied on the inner side of the attachment element,
wherein a backing washer, covering the threaded bushing on the inner side of the attachment element, is provided between the inner side of the attachment element and the at least one permanent magnet.

6. The rotor as recited in claim 5, wherein the rotor body has a further backing washer on a side of the permanent magnet which faces away from the threaded bushing.

7. A rotor for an electric drive unit for driving a compressor, or a turbine, or a turbocharger shaft of an exhaust-gas turbocharger, comprising:
a rotor body embodied around a rotation axis of the rotor and being mountable using a threaded bushing on a turbocharger shaft of the exhaust-gas turbocharger;
a receptacle for at least one permanent magnet embodied on the rotor body;
at least one permanent magnet disposed in the receptacle of the rotor body;
wherein the rotor body has a further receptacle which extends in a direction of the rotation axis and in which the threaded bushing is disposed inside the rotor body, the further receptacle being disposed in the rotor body with an offset in a direction of the rotation axis relative to the receptacle of the at least one permanent magnet, wherein the rotor body has, concentrically with the rotation axis, a cylindrical bore, an inside diameter of the cylindrical bore being smaller than an inside diameter of the further receptacle, forming a step which constitutes a support for the threaded bushing.

8. An exhaust-gas turbocharger, comprising:
an electric drive unit configured to drive a compressor, or a turbine, or a turbocharger shaft of the exhaust-gas turbocharger;
the turbocharger shaft mounted rotatably around a rotation axis; and
the electric drive unit having a rotor and a stator, the stator having a drive winding for generation of a driving magnetic field driving the rotor, the rotor having a rotor body embodied around the rotation axis, a receptacle for at least one permanent magnet being embodied on the rotor body, at least one permanent magnet being disposed in the receptacle of the rotor body, the rotor body being thread-mounted by way of a threaded bushing onto an external thread of the turbocharger shaft in such a way that a clamping force acting in a direction of the rotation axis presses the rotor body indirectly or directly against a stop on the turbocharger shaft, wherein the rotor body has a further receptacle which extends in the direction of the rotation axis and in which the threaded bushing is disposed inside the rotor body, the further receptacle being disposed in the rotor body with an offset in the direction of the rotation axis relative to the receptacle of the at least one permanent magnet, wherein the rotor body has, concentrically with the rotation axis, a cylindrical bore, an inside diameter of the cylindrical bore being embodied to create a clearance fit or an interference fit between the turbocharger shaft and an inner wall of the bore.

9. The exhaust-gas turbocharger as recited in claim 8, wherein the clamping force acting in the direction of the rotation axis presses the rotor body against a compressor wheel of the compressor, and presses the compressor wheel at least indirectly against a stop on the turbocharger shaft.

* * * * *